(12) United States Patent
Chadha

(10) Patent No.: US 8,509,418 B1
(45) Date of Patent: Aug. 13, 2013

(54) INTERACTIVE VOICE RESPONSE SYSTEM PROVIDING VISUAL REPRESENTATION OF CALLER'S INTENT

(75) Inventor: John Chadha, Hillsborough, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 82 days.

(21) Appl. No.: 13/234,820

(22) Filed: Sep. 16, 2011

(51) Int. Cl.
*H04M 3/00* (2006.01)
*H04M 5/00* (2006.01)

(52) U.S. Cl.
USPC ............... 379/265.09; 379/266.01; 379/309

(58) Field of Classification Search
USPC ................... 379/265.09, 266.01, 309
See application file for complete search history.

(56) References Cited

U.S. PATENT DOCUMENTS

| | | | | |
|---|---|---|---|---|
| 5,812,638 A | * | 9/1998 | Muller | 379/88.09 |
| 2012/0213343 A1 | * | 8/2012 | Gao et al. | 379/88.01 |

* cited by examiner

*Primary Examiner* — Quynh Nguyen

(57) ABSTRACT

A system for providing a live agent with information on a telephone call has an interactive voice response (IVR) mechanism responding to a telephone call placed by a caller by providing a request signal transferred to the caller. The caller may be requested to produce a voice response indicating a purpose of the telephone call. A speech recognition mechanism processes the caller's voice response so as to produce a data signal representing a recognized voice response. A computer telephony integration (CTI) unit forwards to the live agent the telephone call from the caller, concurrently with forwarding the data signal representing the recognized voice response to a terminal for display to the live agent. The CTI unit may perform a screen popping function to display the data signal as a visual object at the terminal of the live agent. The visual object may include a text corresponding to the recognized voice response.

13 Claims, 2 Drawing Sheets

INTERACTIVE VOICE RESPONSE SYSTEM PROVIDING VISUAL REPRESENTATION OF CALLER'S INTENT

TECHNICAL FIELD

The present subject matter relates to techniques for providing a live agent at a call center with visual representation of a caller's intent.

BACKGROUND

A mobile station user can dial a predetermined number, such as a customer service number, to reach an Interactive Voice Response (IVR) system which may provide one or more selected items of information to the user, or route the call to a call center per the user's request. Once the call reaches the call center, an agent speaks to the customer to resolve her need.

The IVR system interacts with the caller, by collecting caller's inputs entered using a telephone keypad and responding with voice. For example, when the caller dials a customer service number, the IVR system greets the caller with audio content and guides her using audio step-by-step instructions providing the caller with available choices, such as press 1 for hearing your balance, press 2 for bill information, etc. When the caller presses a selected key, the IVR responds with an audio response based on the pressed key.

Per caller's request, a call can be transferred to a call center to enable the caller to speak with a live person. While a call is delivered to the call center, one business objective is on completing the call as quickly as possible. This is typically measured by the average handling time (AHT) for each live agent at the call center. In order to help the agent to meet this objective, information collected in the IVR system is delivered to the live agent.

In particular, each menu and option in the IVR system has a unique code associated with that menu and option. When a caller interacts with the IVR system, the caller's actions are identified by Activity identifications (IDs) that represent codes of the menus and options selected by the caller.

The call from the IVR system is delivered to the call center via a computer telephony integration (CTI) unit. This unit allows data to be passed from the IVR system to the agent's desktop terminal, together with a voice call. As the CTI unit transfers the call from the IVR system to the call center, the Activity IDs associated with the caller are concatenated in the CTI unit for delivery to the call center. An Automated Customer Support System (ACSS) arranged at the call center translates the Activity IDs into a readable text which is then displayed by the agent's desktop terminal when the agent communicates with the caller. This text indicates the last location in the IVR system flow reached by the caller before the call was transferred to the call center.

However, Activity IDs provide limited information and may not allow a live agent to understand the actual intent of the respective caller. For example, if the caller presses 0 at the payment menu, the Activity ID representing the payment menu will be delivered to the call center. The ACSS would translate this code into text like "customer trying to perform payment in IVR." In reality, the customer may have a specific issue relating to payments. For example, the customer may need to know how to make a credit card payment.

Hence, the live agent does not have sufficient information about a caller's intent in order to address the issue raised by the caller as quickly as possible. The need exists for a technique to provide a live agent with information that would enable the agent to quickly identify the purpose of the call and reduce inquiry time.

SUMMARY

The teachings herein offer an effective technique for providing a live agent with adequate information on a telephone call being forwarded to the live agent so as to enable the live agent to quickly understand a caller's intent.

An exemplary system for providing a live agent with information on a telephone call includes an interactive voice response (IVR) mechanism that receives a telephone call placed by a caller and provides a request signal transferred to the caller. For example, the caller may be asked "how can I help you?" so as to cause the caller to produce a voice response indicating a purpose of the telephone call. A speech recognition mechanism processes the caller's voice response so as to produce a data signal representing a recognized voice response. A computer telephony integration (CTI) unit forwards to the live agent the telephone call from the caller, together with forwarding the data signal representing the recognized voice response to a terminal for display to the live agent. For example, the CTI unit may perform a screen popping function to display the data signal as a visual object at the terminal of the live agent. The visual object may include text corresponding to the recognized voice response.

The IVR mechanism may be configured to give the caller an option to speak into the system. The caller is provided with the request signal if the caller selects the option to speak.

In an exemplary embodiment, the telephone call is received from a mobile station.

An exemplary method of providing a live agent with information on a telephone call being forwarded to the live agent, involves receiving by an IVR system a telephone call placed by a caller, responding to the telephone call by providing the caller with a request signal, recognizing a voice response presented by the caller in response to the request signal, producing a data signal representing the recognized voice response, forwarding to the live agent the telephone call, and concurrently forwarding the data signal to a terminal for display to the live agent.

The data signal may be displayed at the terminal of the live agent as text representing the recognized voice response. The voice response may present the intent of the caller.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
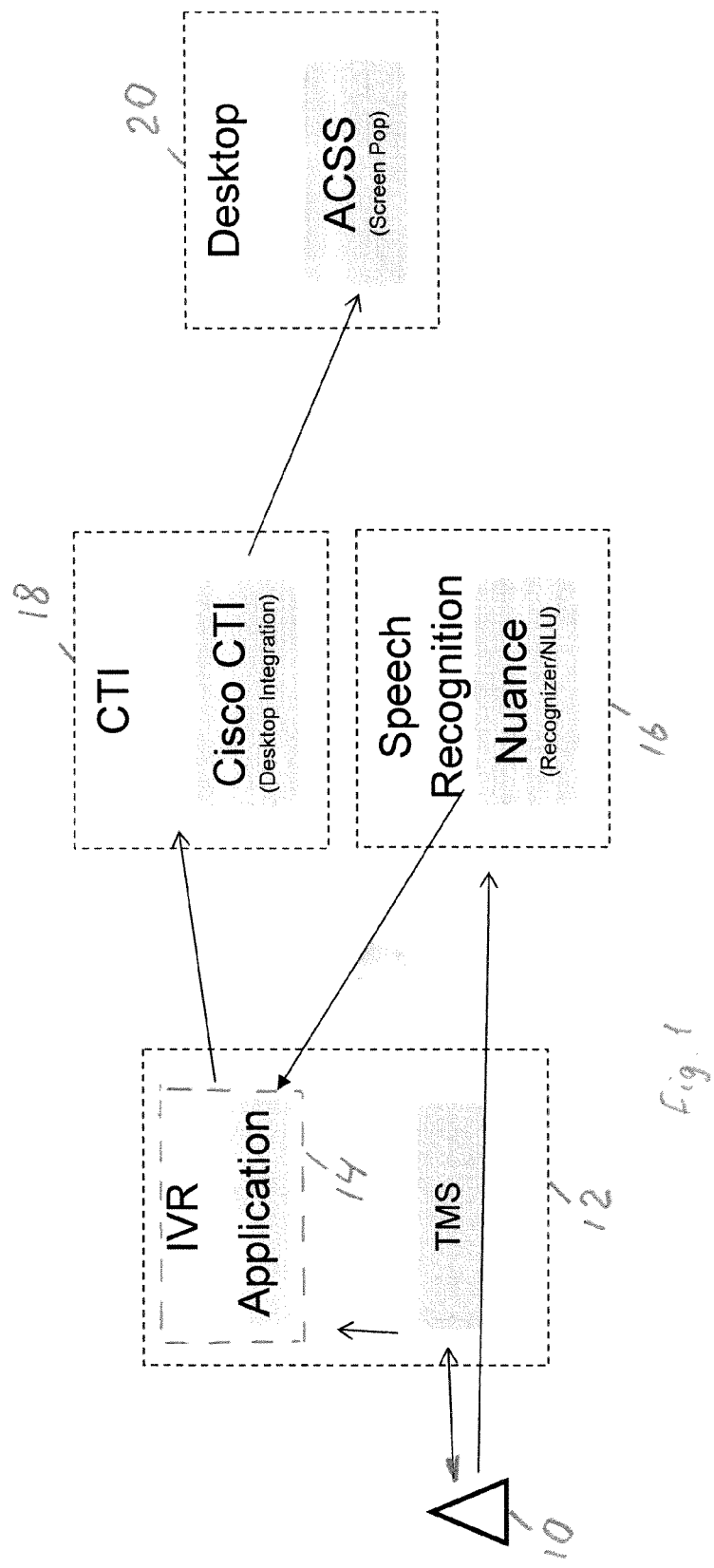
FIG. 1 is a simplified block diagram illustrating exemplary functional elements involved in implementing an Interactive Voice Response (IVR) procedure of the present disclosure.

FIG. 1 is a simplified block diagram illustrating exemplary functional elements of an Interactive Voice Response (IVR) system for providing a live agent at a call center with visual representation of a caller's intent. Although this example illustrates an IVR procedure in a wireless communication system, one skilled in the art would understand that the IVR procedure of the present disclosure may be implemented in any communication system.

FIG. 1 shows an exemplary wireless mobile station 10 that enables a caller to place a telephone call. The mobile station 10 may be any mobile telephone device, such as a handset, capable of receiving and transmitting voice signals. When the caller dials a predetermined telephone number, such as a customer service number, the mobile station 10 may be connected via a wireless communication network to a telephone media server (TMS) 12 including a telephony interface for supporting communications with mobile stations via a wireless network. The TMS 12 includes an application processor (AP) (not shown) for running multiple customer service-related computer applications that may be executed to provide various services that may be requested by callers. For example, the TMS 12 may be implemented using the AVAYA Media Processing Server (MPS) developed by Avaya Inc.

In particular, when the TMS 12 detects a telephone call from the mobile station 10, the AP launches an Interactive Voice Response (IVR) application 14 that allows a caller to interact with the TMS 12. The IVR application 14 is run by the AP to collect the caller's inputs entered using a telephone keypad and to respond with voice signals. When the caller dials a customer service number, the caller may be greeted with audio content and provided with available options, such as "press 1 to hear your balance," "press 2 for bill information," etc. When the caller presses a selected key, the IVR 14 controls the TMS 12 to respond with an audio response based on the pressed key. Per caller's request, a call can be transferred to a call center to enable the caller to speak with a live agent.

A conventional IVR system collects information on choices made by a caller when she navigates through the IVR system. In particular, each menu and option in a conventional IVR system has a unique code associated with that menu and option. When a caller interacts with the IVR system, the caller's actions are identified by Activity IDs that represent codes of the menus and options selected by the caller. The Activity IDs are transferred to the call center, together with a telephone call from the respective caller.

However, Activity IDs do not allow a live agent to understand the intent of the respective caller. Hence, with conventional IVR systems, the live agent does not have sufficient information about the caller's intent in order to address the issue raised by the caller as quickly as possible.

The IVR application 14 provides a Visual Voice function that enables a live agent at a customer service to receive a visual object representing a caller's intent, instead of receiving text based on Activity IDs. For example, among the options presented by the IVR application 14 during a greeting phase may be an option to speak into the system, instead of pressing a telephone key. If the caller selects this option, the IVR application 14 controls the TMS 12 to send to the caller an audible request signal requesting the caller to provide information about the caller's intent, i.e., the purpose of the telephone call. For example, the caller may be asked "how can I help you?" Alternatively, the request signal may be in a form of a visual object displayed on the screen of the mobile station 10 and requesting the caller to verbally express her intent.

When a voice response from the caller is detected by the TMS 12, the IVR application 14 controls the TMS 12 to forward the voice response to a speech recognition system 16 that performs speech recognition functions to recognize the voice response from the caller. For example, the caller may say "price plan change." The speech recognition system 16 recognizes this phrase and returns to the TMS 12 a text string of words spoken by the caller. The speech recognition system 16 may be arranged on a server separate from the TMS 12.

In an exemplary embodiment of the present disclosure, the Nuance Recognizer developed by Nuance Communications, Inc. may be used for performing speech recognition functions. The Nuance Recognizer includes a speech detector that detects speech and provides its semantic processing based on pre-defined grammar rules.

To provide recognition of the caller's "natural language," the Recognizer may be integrated with the Natural Language Understanding (NLU) engine. For example, the Nuance NLU developed by Nuance Communications may be used as the NLU engine. The NLU enables a speech recognition system to avoid "out of grammar" errors occurring when the speaker says something that does not comply with the grammar rules. The NLU engine studies examples of what people might say and creates statistical models that help it understand the caller's speech without having to manually predict each variation.

When the TMS 12 receives the text string of the spoken words from the speech recognition system 16, the IVR application 14 controls the TMS 12 to forward this text string, together with the respected call, to a computer telephony integration (CTI) unit 18. The CTI unit 18 performs CTI desktop functions carried out to coordinate voice and data transfers between the TMS 12 and a desktop work station 20 assigned to a live agent at a call center.

In particular, the CTI unit 18 performs a screen popping function to display a visual object, such as a screen pop, representing the text string of the spoken words on the work station 20. The CTI unit 18 performs coordination among multiple agents' workstation to display a screen pop representing the spoken words of a particular caller at the workstation assigned to the live agent that receives the telephone call from that caller. Hence, the live agent connected to the caller who indicated her intent with the phrase "price plan change" can see the screen pop "price plan change." As a result, the live agent will immediately understand the caller's intent and will be able to provide an appropriate response very quickly.

For example, the Cisco CTI developed by Cisco Systems, Inc. may be used as the CTI unit 18. An Automated Customer Support System (ACSS) may be provided at the call center to enhance live agents' communication with callers. The ACSS provides a graphical interface that facilitates agents' access to information that may be requested by callers.

As shown by the above discussion, functions relating to the IVR-related techniques may be implemented on computers connected for data communication via the components of a packet data network. Although special purpose devices may be used, such devices also may be implemented using one or more hardware platforms intended to represent a general class of data processing device commonly used to run "server" programming so as to implement the IVR-related techniques discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the IVR-related techniques. The software code is executable by the general-purpose computer that performs the IVR-related techniques. In operation, the code is stored within the general-purpose computer platform. At other times, however, the software may be stored at other locations and/or transported for loading into the appropriate general-purpose computer system. Execution of such code by a processor of the computer platform enables the platform to implement the IVR-related techniques, in essentially the manner performed in the implementations discussed and illustrated herein.

Figure 2:
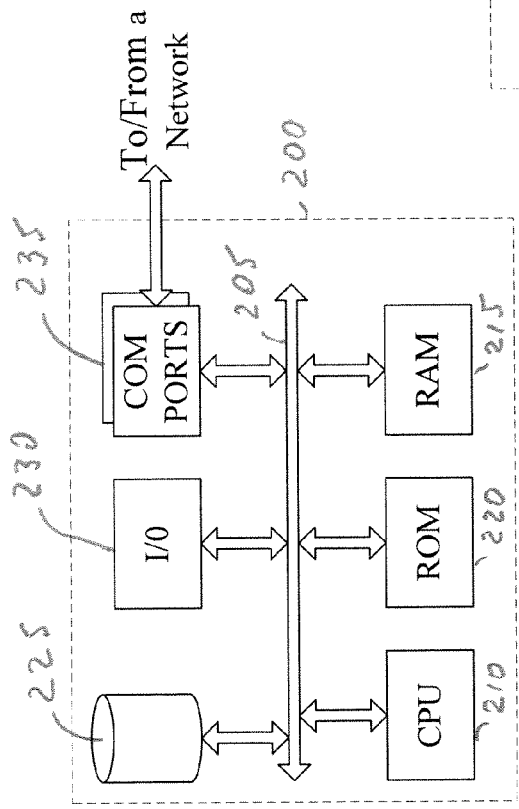
FIGS. 2 and 3 are functional block diagrams illustrating general purpose computer hardware platforms that may be used for implementing the IVR procedure.
Figure 3:
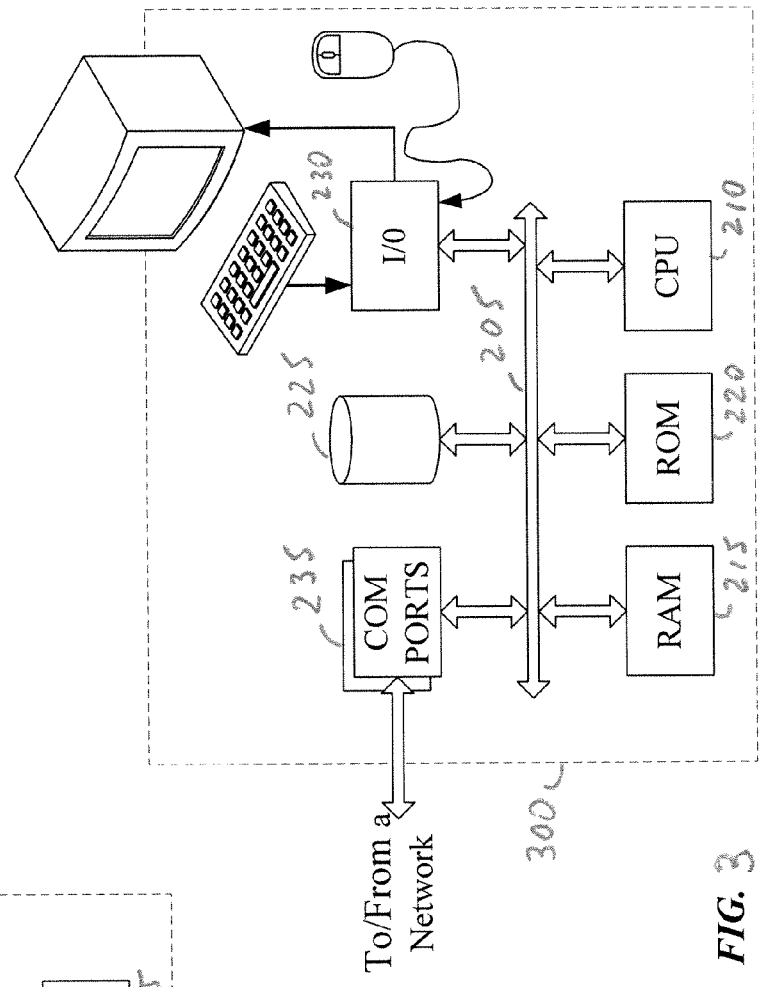

FIGS. 2 and 3 provide functional block diagram illustrations of general purpose computer hardware platforms. FIG. 2 illustrates a network or host computer platform 200, as may typically be used to implement a server. FIG. 3 depicts a computer 300 with user interface elements, as may be used to implement a personal computer or other type of work station or terminal device, although computer 300 may also act as a server if appropriately programmed. It is believed that those skilled in the art are familiar with the structure, programming and general operation of such computer equipment and as a result the drawings should be self-explanatory.

Computers 200 and 300 each include a bus 205, processing unit(s) 210, a system memory (RAM) 215, a read-only memory (ROM) 220, a permanent storage device 225, an input/output (I/O) device interface 230, and a communication interface 235.

The bus 205 collectively represents all system, peripheral, and chipset buses that communicatively connect the numerous internal devices of the electronic system 200 or 300. For instance, the bus 205 communicatively connects the processing unit(s) 210 with the read-only-memory (ROM) 220, the system memory 215, and the permanent storage device 225.

From these various memory units, the processing unit(s) 210 retrieves instructions to execute and data to process in order to execute the processes of the invention. The processing unit(s) can be a single processor or a multi-core processor in different implementations.

The ROM 220 stores static data and instructions that are needed by the processing unit(s) 510 and other modules of the electronic system. The permanent storage device 225, on the other hand, is a read-and-write memory device. This device is a non-volatile memory unit that stores instructions and data even when the electronic system 200 or 300 is off. Some implementations of the invention use a mass-storage device (such as a magnetic or optical disk and its corresponding disk drive) as the permanent storage device 225.

Other implementations use a removable storage device (such as a floppy disk, flash drive, and its corresponding disk drive) as the permanent storage device 225. Like the permanent storage device 225, the system memory 215 is a read-and-write memory device. However, unlike storage device 225, the system memory 215 is a volatile read-and-write memory, such a random access memory. The system memory 215 stores some of the instructions and data that the processor needs at runtime. In some implementations, the invention's processes are stored in the system memory 215, the permanent storage device 225, and/or the read-only memory 220. For example, the various memory units include instructions for processing multimedia items in accordance with some implementations. From these various memory units, the processing unit(s) 210 retrieves instructions to execute and data to process in order to execute the processes of some implementations.

The bus 205 also connects to the input/output device interface 230. Input devices used with I/O device interface 230 include, for example, alphanumeric keyboards and pointing devices (also called "cursor control devices"). Output devices used with I/O device interface 230 include, for example, printers and display devices, such as cathode ray tubes (CRT) or liquid crystal displays (LCD). Some implementations include devices such as a touchscreen that functions as both input and output devices.

Finally, as shown in FIGS. 2 and 3, bus 205 also couples electronic system 200 or 300 to a network (not shown) through a communication interface 235. In this manner, the computer can be a part of a network of computers (such as a local area network ("LAN"), a wide area network ("WAN"), or an Intranet, or a network of networks, such as the Internet. Any or all components of electronic system 200 or 300 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the IVR-related techniques outlined in this disclosure may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into another computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the IVR-related techniques discussed in this disclosure. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for providing a live agent with information on a telephone call being forwarded to the live agent, the system comprising:
   an interactive voice response (IVR) mechanism responsive to a telephone call placed by a caller to provide an audible or visual request signal transferred to the caller,
   a speech recognition mechanism responsive to a caller's voice response to the request signal so as to produce a data signal representing a recognized voice response determined based on the caller's voice response, and
   a computer telephony integration (CTI) unit for forwarding to the live agent the telephone call from the caller, concurrently with forwarding the data signal representing the recognized voice response, to a terminal for display to the live agent,
   the IVR mechanism being configured to forward the caller's voice response to the speech recognition mechanism, to receive from the speech recognition mechanism the data signal representing the recognized voice response, and to control the CTI unit to forward the telephone call together with the data signal.

2. The system of claim 1, wherein the CTI unit is configured for performing a screen popping function to display the data signal as a visual object at the terminal of the live agent.

3. The system of claim 2, wherein the visual object includes text corresponding to the recognized voice response.

4. The system of claim 1, wherein the IVR mechanism is configured to cause the caller to produce the voice response indicating a purpose of the telephone call.

5. The system of claim 1, wherein the IVR mechanism is configured to provide the caller with an option to speak, and to provide the caller with the request signal if the caller selects the option to speak.

6. The system of claim 1, wherein the caller is provided with an option to present visual or audible response to the request signal.

7. A method of providing a live agent with information on a telephone call being forwarded to the live agent, the method comprising the steps of:
   receiving by an interactive voice response (IVR) system a telephone call placed by a caller,
   responding to the telephone call by providing the caller with an audible or visual request signal,
   forwarding by the IVR system a voice response presented by the caller in response to the audible request signal, to a voice recognition system,
   recognizing by the voice recognition system the voice response to produce a data signal representing the recognized voice response determined based on the voice response,
   receiving by the IVR system the data signal,
   forwarding by the IVR system the telephone call to the live agent, and
   concurrently with the forwarding, sending the data signal from the IVR system to a terminal for display to the live agent.

8. The method of claim 7, wherein the request signal is produced to determine intent of the caller.

9. The method of claim 7, wherein the data signal is displayed as a text at the terminal of the live agent, the text representing the recognized voice response.

10. The method of claim 7, wherein the caller is presented with an option to speak, and the request signal is produced when the caller selects the option to speak.

11. The method of claim 7, wherein the caller is provided with an option to present visual or audible response to the request signal.

12. The system of claim 5, wherein the option to speak is provided by the IVR mechanism to the caller during a greeting phase and is presented as an option to the caller instead of pressing a telephone key.

13. The system of claim 5, wherein in response to receiving selection of the option to speak by the caller, the IVR mechanism controls a telephone media server to send to the caller the request signal as:
   an audible request signal requesting the caller to provide the caller's intent, or
   a visual object displayed on a screen of a mobile station of the caller and requesting the caller to verbally express the caller's intent.

* * * * *